June 25, 1968  W. R. APBLETT ETAL  3,390,250
APPLICATION OF A PULSATING CURRENT TO
TUBE-TO-TUBE SHEET WELDING
Filed Nov. 16, 1964  2 Sheets-Sheet 2

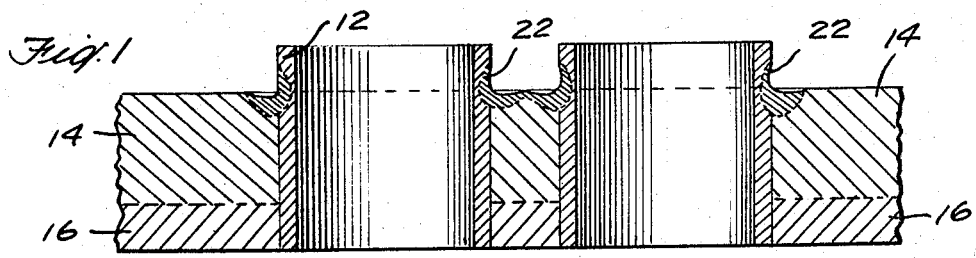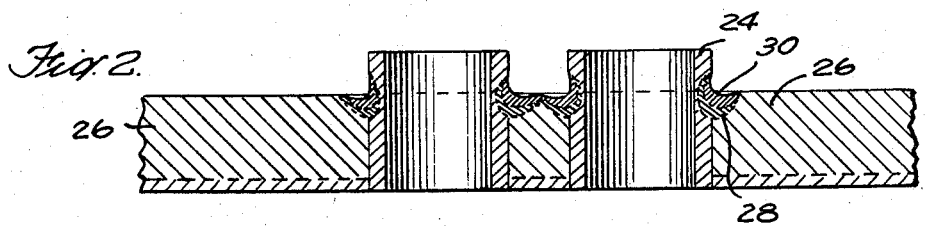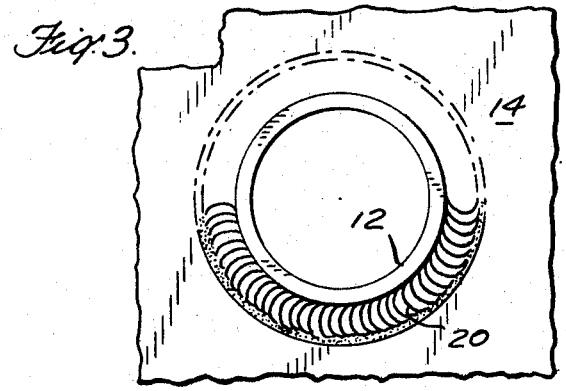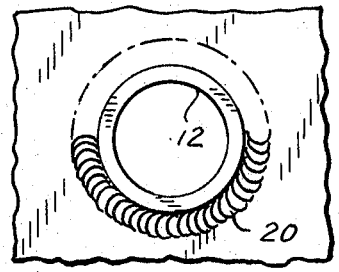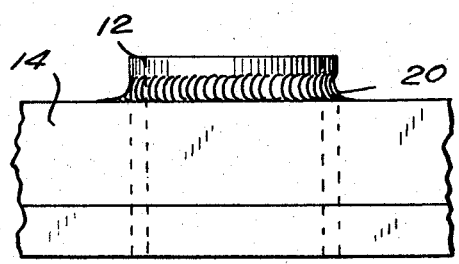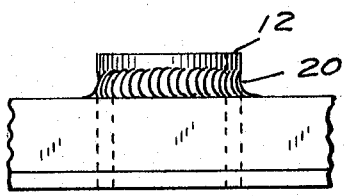

INVENTORS
JOSEPH MARTIN
EDWARD J. PHILIPPS
WILLIAM R. APBLETT
BY Richard H. Thomas
ATTORNEY

United States Patent Office 3,390,250
Patented June 25, 1968

3,390,250
APPLICATION OF A PULSATING CURRENT TO TUBE-TO-TUBE SHEET WELDING
William R. Apblett, Metuchen, Joseph Martin, Menlo Park, and Edward J. Philipps, Scotch Plains, N.J., assignors to Foster Wheeler Corporation, New York, N.Y., a corporation of New York
Filed Nov. 16, 1964, Ser. No. 411,409
5 Claims. (Cl. 219—125)

ABSTRACT OF THE DISCLOSURE

A method of welding in which a pulsating direct current having a frequency of ten to one-half cycles per second is supplied to a nonconsumable electrode, and the electrode is moved along the weld area with a travel rate of 0.020 inch to 0.093 inch per pulse.

---

It is known to weld a tube to a tube sheet using a nonconsumable tungsten electrode. The electrode is positioned at a predetemined angle with reference to the axis of the tube, and is moved around the tube at a predetermined rate. A welding arc is fired between the electrode and weld area so that a weld seal is produced between the tube and the tube sheet. A ring of filler material may be placed about the tube and fused into the weld during the welding process, or a filler wire may be continuously fed into the welding arc. In this prior process, it is conventional practice to use a constant direct current.

Despite many refinements in the process, diffculties are frequently experienced. For instance, an occasional lack of surface wetting between the weld metal and the tube wall creates what is called "misses," where there is an absence of a seal or fusion between the tube sheet and the tube.

In addition, the prior process is characterized by frequent severe undercutting of the adjacent vertical tube wall surface above the weld.

Further, if a cold wire is continuously fed into the arc to provide filler metal, the constant direct current may cause "balling" of the filler wire with the molten metal accumulating on the end of the wire and then dropping off in large amounts creating unevenness in the weld.

All attempts towards minimizing these difficulties require critical careful positioning of the tungsten electrode and the filler wire (if employed), and other close controls, making quality joining of tubes to a tube sheet extremely expensive.

Accordingly, it is an object of the present invention to provide a method which overcomes the above disadvantages, and in which the physical position of the tungsten electrode and filler wire is less critical.

The method of the invention includes the steps of positioning a nonconsumable tungsten arc welding electrode so that the tip thereof is directed toward the weld area, supplying to the electrode a pulsating direct current of varying intensity having an amperage varying between predetermined limits and a pulse amplitude of at least 20 amperes, at a rate in the range of ten cycles per second to ½ cycle per second, striking an arc between the electrode tip and electrode area, and moving the electrode along the line of contact between the surfaces to be welded to effect the weld.

The invention and advantages thereof will become apparent upon consideration of the following specification, and accompanying drawings, in which:

FIGURES 1 and 2 show tube to tube sheet welds accomplished in accordance with the invention;

FIGURES 3 and 4 are top and side views of the welds of FIG. 1;

FIGURES 5 and 6 are top and side views of the welds of FIG. 2;

In the example of FIGS. 1, 3, and 4, stainless steel tubes 12 were welded to a stainless steel overlay or cladding 14 on a carbon steel tube sheet 16, horizontally supported. The tube sheet and cladding were provided with holes having an inside diameter of between .756 inch and .774 inch. The tubes inserted in the holes had a .750 inch outside diameter with a minimum wall thickness of .050 inch. The stainless steel cladding was about ⅜ inch thick, and the tubes were inserted through the holes extending above the surface of the cladding $3/16 \pm 1/64$ inch.

Figure 7:
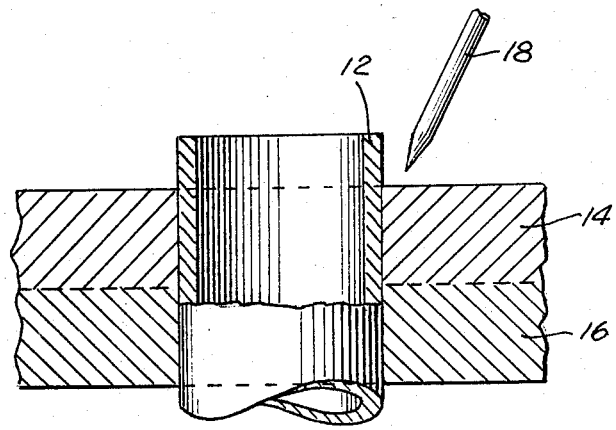
FIGURE 7 illustrates the method in accordance with the invention.

An electrode 18 (FIG. 7) was positioned .025±.005 inch away from the surface of the cladding 14 with the tip .054±.005 inch away from the outside surface of the tube. Concerning the angle of the electrode relative to the tube axis, satisfactory results were achieved with an angle of 23°. The electrode was a non-consumable tungsten wire having a $3/32$ inch diameter necking down as a frusto-conical tip having a face diameter of about .020 inch. It was found that more consistent results were achieved by providing the electrode with such a frusto-conical tip and flattened face. With too large a diameter face, the cathode spot tended to move around the tip, whereas a pointed electrode produced too wide an arc exposure to achieve the results desired.

Figure 8:
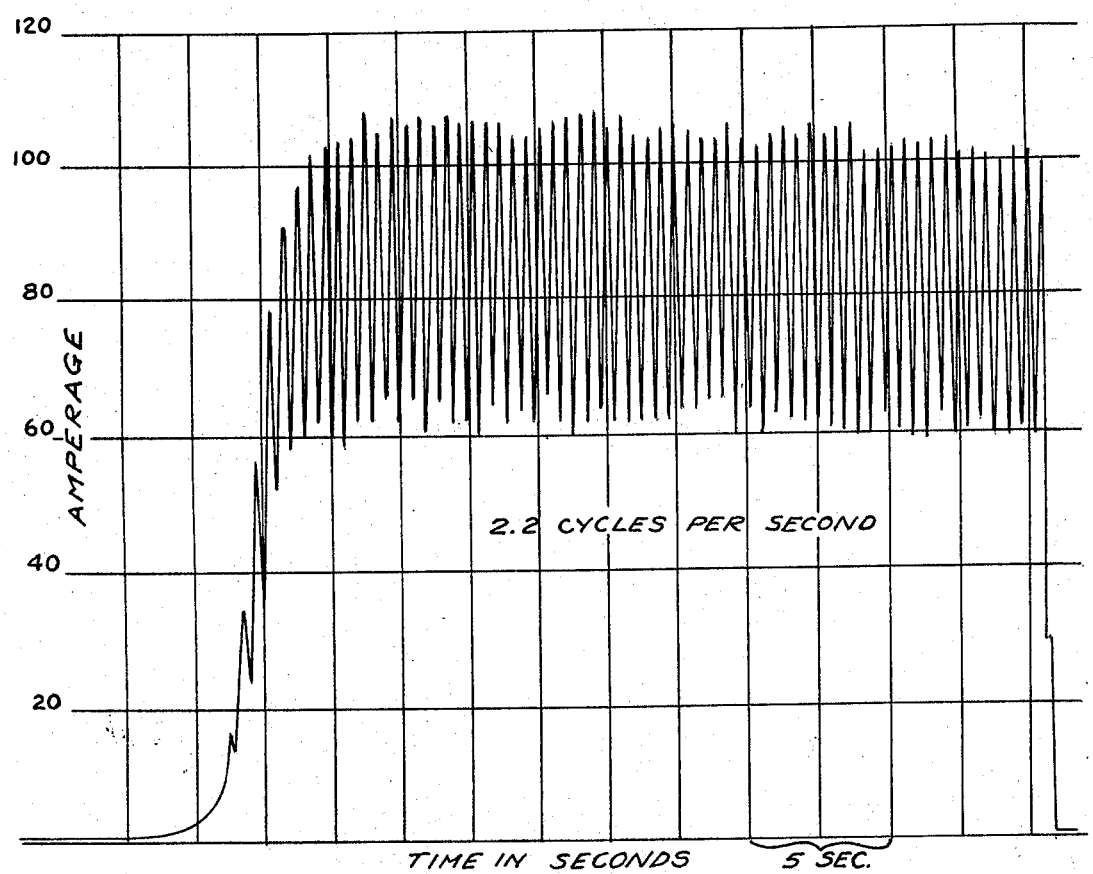
FIGURE 8 shows a typical relationship of amperage to time used in supplying a pulsating direct current in accordance with the invention.

In this example, the electrode was supplied with a pulsating direct current having an average current of about 80 amperes varying between about 60 amperes and about 100 amperes with a pulsing rate of 2.2 cycles per second (FIG. 8), and a voltage in the range of nine to 11. An inert argon gas was used to shield the weld and a single pass in a clockwise direction was made terminating the pass after one revolution with a slight overlap.

The rate of rotation could be varied, but too slow a rate results in excessive penetration of the weld in the tube, whereas too high a rate results in insufficient penetration and misses. The rate in this example was 24 seconds per revolution, or approximately a pulse every $1/16$ inch of travel.

No filler metal was used in this first pass.

FIGS. 3 and 4 clearly show the results achieved. The pulsating current generates a mechanical motion of waves of molten metal corresponding to the frequency of the pulses. The waves of molten metal flow underneath the tungsten electrode from the pulsing force of the arc wetting the outside surface of the tube and producing a series of arcuate lines or ripples 20 (FIGS. 3 and 4).

In innumerable tests, no lack of fusion was encountered, and the mechanical wave motion tended to overcome any lack of surface wetting or misses because of inaccuracy or faults in spacing, rate of rotation and the like.

It was also found, in accordance with the invention, that the pulsating current tended to minimize undercutting of adjacent vertical surfaces of the tube wall. For instance, undercutting in the area 22 (FIG. 1) was in the range of .002 inch to .004 inch as compared to .005 inch to .008 inch using conventional methods.

In tests conducted using a filler wire, a third benefit was noted, namely, that the pulsating current prevented balling of the cold wire and erratic deposition of metal in the weld area.

One criteria for a good weld is the leak path of the weld, the leak path being defined as the shortest distance between the surface of the weld and junction of the weld and tube outside diameter. Conventionally, with stainless steel tubes and cladding, various specifications require a minimum leak path of ¾ T to 1¼ T, T being the tube thickness. It was found, in the example cited and accordance with the invention, that a single weld pass provided the desired leak path. Normally, partly because of lack of surface wetting in certain areas, two passes are required.

In the example, the rate of rotation, arc length, spacing of the electrode tip from the cladding and from the tube), and angle of the electrode with the work were given predetermined values, and other variables were then determined to achieve optimum results. These predetermined conditions can be varied with consequent variation of other limits.

The rate of rotation affects the heat input into the area being welded. As indicated above, decreasing the rate of rotation results in excessive penetration, whereas an increase in rate of rotation requires a corresponding current increase to achieve satisfactory heat input and penetration. For instance, a rate of rotation corresponding to a pulse of every 3/32 (.093) inch and a pulsing rate of 2.2 cycles per second, can be used with an average current of 95 amperes. (The example used a pulse every 1/16 inch of travel and 80 amperes.) It is contemplated that satisfactory results in most instances will be achieved using a rate of rotation (or travel) corresponding to .020 inch to .093 inch per pulse. In this respect, depending on the equipment used, the pulsing rate preferably is between ½ a cycle per second and ten cycles per second.

With respect to the arc length and spacing of the electrode tip from the cladding and from the tube, the dimensions given represent those designed to give a short arc length. It is contemplated that longer arc lengths can be used, requiring increased voltage in accordance with known arc welding procedures. Generally, the voltage will be in the range of seven to 14 volts, and preferably nine to 11 volts. In addition, an increase in arc length requires a greater pulse amplitude for the pulse to achieve the same mechanical wave motion, and conversely, as the electrode is moved closer to the work, the more concentrated force permits a smaller amplitude. Actually, for most applications, the dimensions given are minimum dimensions since closer spacing of the electrode tip to the weld can result in misses.

Concerning angle of the electrode, to raise the torch or increase the angle of the torch relative the horizontal is apt to result in lack of wetting of the tube walls, whereas too small an angle relative the horizontal directs too much heat into the tube walls with possible penetration of the weld to the inside surface of the tubes. Depending upon the application involved, and such factors as tube materials and tube thickness satisfactory results are obtained using an electrode angle between ten and 35° with the axis of the tube, and preferably 17° to 26°.

In the example, the pulse amplitude used was about 40 amperes. Generally speaking, a larger pulse amplitude, for instance an amperage varying between 70 and 120 amperes, is more effective in exaggerating or increasing the mechanical action or movement of the molten material, and for most purposes, an amperage variation of plus and minus ten amperes (a pulse amplitude of 20 amperes) is minimum. An amplitude of at least 40 amperes is preferred.

To obtain the desired heat input, the average amperage can be varied, and for most applications will be at least 80 amperes. In this respect, the average need not be the mean amperage. For instance, 20 to 30 percent of the pulse heat input could come from the high side of the mean and the balance from the low side, depending on the wave configuration. Such an unbalance provides a greater cool-off time permititng a higher pulse amplitude to achieve greater penetration and wave motion.

FIGS. 2, 5, and 6 illustrate the invention in connection with welding of high nickel content alloys. In this example, two passes are used to provide a leak path of at least 1¼ T, a standard requirement for such alloys which, for example, may contain approximately 78 percent nickel.

Tubes 24, of such alloy content having about a .507 inch O.D. and a minimum wall thickness of about .042 inch, were welded to cladding 26 of substantally the same composition, the first weld pass producing the weld 28 and the second producing the weld 30. The specifications for the welding were approximately the same as those for steel, except that an average current of 90 amperes was used with a rotation time in the area of 18 seconds per revolution.

The advantages obtained in connection with the method of FIGS. 1 and 3–4 were also obtained in welding such high nickel metals.

To achieve a pulsating current and produce a continuous arc of varying intensity, a varying resistance may be introduced into a magnetic amplifier or field circuit of a constant current type welding power supply. Alternately shunting of such a resistor will generate the current pulses, and the frequency and dwell time of the shunting will control the magnitude of the current pulses. Known timing circuits can be employed to shunt the resistor.

The same effect can be achieved by a high current resistor electrically in parallel with the arc. By permitting some of the power supply's output to be shunted around the arc through the resistor, a current pulsing condition at the welding arc is similarly generated.

Although the invention has been described with respect to specific embodiments, many variations within the scope and spirit of the invention as defined in the following claims will be apparent to those skilled in the art.

We claim:

1. A method of welding together two surfaces at an angle with respect to each other comprising the steps of:
   positioning said surfaces in juxtaposition;
   positioning a nonconsumable arc welding electrode so that the tip thereof is directed towards the weld area;
   supplying a pulsating direct current to said electrode, said pulsating direct current having a frequency in the range of ten cycles per second to one-half a cycle per second and an amplitude of at least 20 amperes;
   striking an arc between the electrode and the weld area; and
   moving the electrode along the line of contact between the two surfaces effecting the weld with a rate of travel within the range of 0.020 inch per pulse to 0.093 inch per pulse.

2. A method for welding tubes to a tube sheet comprising the steps of:
   forming a hole in the tube sheet;
   passing a tube through the tube sheet hole so that a part thereof projects a short distance above one surface of the tube sheet;
   positioning a nonconsumable tungsten arc welding torch so that the electrode tip thereof is directed towards the weld area at an angle of from about ten through thirty-five degrees with the axis of the tube and is closely spaced to the surface of the tube and tube sheet at least about 0.054 inch and 0.025 inch respectively;
   supplying a pulsating direct current to the electrode having a frequency in the range of from ten cycles per second to one-half cycle per second, a pulse amplitude at least about 40 amperes, and an average current intensity sufficient to achieve a minimum leak path of ¾ T, T being the thickness of the tube;
   striking an arc between the electrode and the weld area; and
   rotating the electrode around the tube at a rate in the range of 0.020 to 0.093 inch per pulse.

3. A method according to claim 5 wherein the average current intensity is at least 80 amperes.

4. The method according to claim 6 using a voltage between nine and 11 volts.

5. A method for welding a stainless steel tube to a stainless steel overlay on a carbon steel tube sheet comprising the steps of:

forming a hole in the stainless steel overlay and the carbon steel tube sheet, said hole having a diameter in the range from 0.756 through 0.774 inch;

passing the stainless steel tube through the hole so that one end projects between 11/64 and 13/64 of an inch above the stainless steel overlay, on the tube sheet, said stainless steel tube having an outside diameter of approximately 0.750 inch and a wall thickness of approximately 0.050 inch;

positioning a nonconsumable tungsten arc welding torch so that the electrode tip thereof is directed towards the weld area at an angle of from about seventeen degrees through twenty-six degrees with the axis of the tube and is closely spaced to the surface of the tube and tube sheet at least about 0.054 inch and 0.025 inch respectively;

supplying a pulsating direct current to the electrode having a frequency in the range of from ten cycles per second to one-half cycle per second, a pulse amplitude of at least about 40 amperes, and an average current intensity of at least 80 amperes;

striking an arc between the electrode and the weld area at an arc voltage between nine volts and eleven volts; and rotating the electrode around the tube at a rate in the range of 0.020 to 0.093 inch per pulse.

References Cited

UNITED STATES PATENTS

| | | | |
|---|---|---|---|
| 2,289,979 | 7/1942 | Mann | 219—135 |
| 2,697,160 | 12/1954 | Williams | 219—135 |
| 3,071,680 | 1/1963 | Anderson et al. | 219—131 |
| 3,118,051 | 1/1964 | Dixon | 219—137 |
| 3,118,052 | 1/1964 | Lippart et al. | 219—137 |
| 3,254,193 | 5/1966 | Phillips | 219—135 |
| 3,275,797 | 9/1966 | Manz | 219—137 |
| 3,291,961 | 12/1966 | Benschop et al. | 219—135 |

RICHARD M. WOOD, *Primary Examiner.*

W. D. BROOKS, *Assistant Examiner.*